Oct. 19, 1926.

F. L. PLATT ET AL 1,603,556

PACKING GLAND

Filed May 19, 1924

Inventor.
F. L. Platt, George N. Hein
Robert R. Imfey
By Acker & Hotter
Attorneys.

Patented Oct. 19, 1926.

1,603,556

UNITED STATES PATENT OFFICE.

FRANK L. PLATT, OF BERKELEY, AND GEORGE N. HEIN AND ROBERT R. IMPEY, OF SAN FRANCISCO, CALIFORNIA.

PACKING GLAND.

Application filed May 19, 1924. Serial No. 714,394.

This invention relates to an improved packing gland construction primarily designed for use in connection with hypodermic syringes, although it is equally as well adapted to syringes of other types and constructions generally where a reciprocating part is provided and a sealed joint is maintained therearound with a minimum of piston friction.

The invention has for its object the utilization of the fluid pressure leaking around the piston into the gland chamber for assisting in maintaining the packing in tight contact with the piston. Another object is to provide an elastic packing on a tubular ferrule or base of an inside diameter larger than the piston, and the skirt of the packing terminating in an opening of a diameter smaller than that of the piston, and also being formed with a feathered edge. A further object is to provide a novel structure wherein the lower portion of the skirt is free to be acted on by the pressure of the fluid escaping around the piston, and wherein a single packing contact is made between the ferrule or base and the edge of the syringe barrel.

With the above mentioned and other objects in view, the invention consists in the novel construction and combination of parts hereinafter described, illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

To more fully comprehend the invention reference is directed to the accompanying drawings, wherein—

Figure 1:
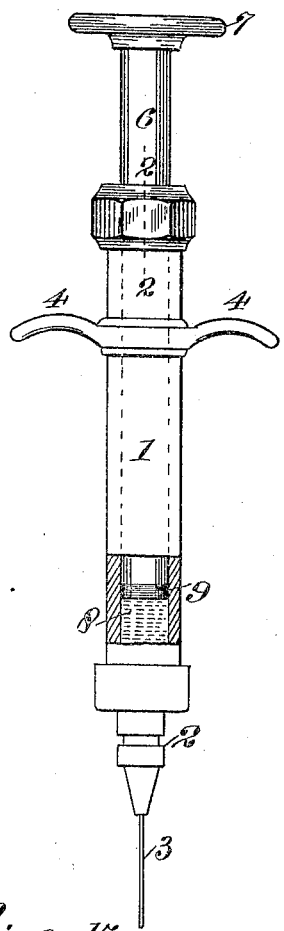
Figure 1 is a view in elevation partly in section of a syringe embodying our invention therein.

In the drawings wherein like characters of reference designate corresponding parts, 1 indicates a tubular syringe barrel mounting at its end a coupling 2 carrying a hypodermic needle 3. The body or barrel is provided with the usual finger grips 4 and the exterior surface adjacent its upper end is threaded as at 5. A piston 6 having a gripping head 7 is mounted to reciprocate in the bore 8 of the barrel 1, and if necessary the piston on its lower end may carry a packing 9. The upper end of the barrel 1 is provided with an enlarged recess or chamber 10 surrounding the bore 8.

To prevent leakage around the piston at the point of its entering the bore 8, we mount a suitable packing, a portion of which extends into the chamber 10, and the packing is preferably constructed in the following manner. A tubular base 11 serves as a support. The base is preferably formed of metal, and is of a relatively rigid structure. The inner walls of the base are preferably parallel, and the opening formed thereby is of a diameter slightly greater than that of the plunger 6. At its upper end the base 11 is provided with an annular outwardly extending flange 12, and at a point below said flange the base is provided with an annular bead 13, the portion of the outer surface of the base below said bead converging inwardly, as at 14, on an angle to intersect the parallel inner walls of the body. Between the body 13 and flange 12, the outer periphery of the body 11 is formed with an annular groove 15, and it will be observed from Figure 2 that the diameter of the base or body 11 at a point transversely through the bead 13 approximates the diameter of the opening 10.

Figure 3:
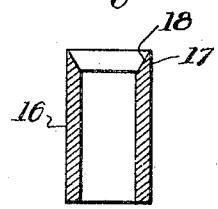
Fig. 3 is a detailed sectional view of the tubular elastic forming a part of the packing structure.
Figure 2:
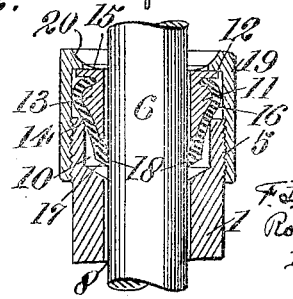
Figure 2 is a vertical sectional view on line 2—2 of Figure 1.

A piece of tubular elastic 16 is stretched over the base 11 with its upper edge received in the groove 15, and its lower portion forming a skirt 17 and extending along the wall 14. The lower edge of the elastic 16 extends a distance below the bottom of the base 11, and the extreme lower edge of the piece of tubular elastic is cut to provide a lower inner edge 18 which is of the commonly termed "feather type." The tubular elastic packing member 16 is longer than the body 11 and normally of cylindrical form as illustrated in Fig. 3. The end portion adapted for engagement with the piston 6 is provided with a beveled inner end portion for application to the body 11 as clearly shown in Fig. 3, forming the above-mentioned "feather tight" edge in order that the application of this elastic to the body 11 will bring the beveled edge 18 into surface contact with the surface of the piston 6. This distortion of the elastic 16 is due to the stretching action of the body 11 on the major portion thereof which causes the end formed with the beveled edge 18 to be distorted from the position shown in Fig. 3 to that shown in Fig. 2 which causes a slight contraction of the normal diameter of the opening formed in this end of the member. As a result the leakage of fluid passing the piston impinges on the outer surface of the elastic 16 as shown in Fig. 2 and has a tendency to force the same toward the piston rather than away from it as would occur if the edge were not beveled as illustrated. The opening provided by the tubular elastic member 17 at the point below the base 11 is slightly less than the diameter of the plunger or piston 6, thereby ensuring the tight frictional engagement of the packing with the plunger or piston. To increase this assurance, it will be observed that when the parts are assembled as in the drawings, the lower edge of the member 17 falls short of contacting with the base of the chamber 10, and that the skirt of the packing at a point above the lower end of the base 11 contacts with the inner upper edge of the recess 10. A gland 19 which threads at 5 to the upper end of the barrel 1 has a flange 20 for bearing on the flange 12, and when the same is threadably connected, downward pressure is exerted on the base 11, and the wall 14 thereof compresses the elastic packing at its point of contact with the upper edge of the wall of the chamber 10, and prevents the escape of fluid from the chamber 10 around the exterior of the packing.

It will be noted that the lower edge of the packing is free, and that the fluid under pressure escaping upwardly around the piston 6 will enter that portion of the chamber 10 exteriorly of the outer surface of the packing and exert an inward pressure on the same and particularly on the feathered edge 18 thereof and tightly press the packing against the piston to prevent the passage of fluid therearound. It will be apparent that the adjustment of the gland 19 does not cause a binding of the packing around the piston, but that the tendency of the rubber or elastic of the packing to contract at the point below the base 11 serves as an additional friction medium between the packing and piston, and that the additional pressure supplied by the fluid increases this pressure.

We claim:

1. A packing including a tubular base having substantially parallel inner walls and provided with a lateral end flange, and its outer wall formed with a circumferential bead below the same, the outer wall below said bead sloping inwardly toward the inner wall, and the portion of the wall between said flange and bead being provided with a circumferential groove, an elastic covering stretched over the outer surface of the base with its upper edge received within the groove and with its lower portion projecting below the tubular base and having a beveled inner edge.

2. A packing including a tubular base having substantially parallel inner walls and provided with a lateral end flange, and its outer wall formed with a circumferential bead below the same, the outer wall below said bead sloping inwardly toward the inner wall, and the portion of the wall between said flange and bead being provided with a circumferential groove, an elastic covering stretched over the outer surface of the base with its upper edge received within the groove and with its lower portion projecting below the tubular base and having a beveled inner edge, the inner diameter of the lower end of the elastic covering being less than the inner diameter of the tubular base.

3. A packing comprising a base member having a central bore, said base member having its outer surface formed with a portion of maximum diameter adjacent one end and having the remaining outer surface tapering from said portion of maximum diameter in opposite directions toward each end of said member, and an elastic covering of normally smaller diameter than the bore of said member and of greater length than said member mounted on the outer surface of said member and having one end portion positioned over said portion of maximum diameter, the opposite end portion of said elastic covering projecting beyond the end of the member and having a beveled inner edge normally contracted to a diameter smaller than said bore.

In testimony whereof we have signed our names to this specification.

FRANK L. PLATT.
GEORGE N. HEIN.
ROBERT R. IMPEY.